United States Patent
Srinivasan (10) Patent No.: US 10,432,543 B2
(45) Date of Patent: Oct. 1, 2019

(54) DUAL JITTER BUFFERS

(71) Applicant: Microsoft Technology Licensing, LLC, Redmond, WA (US)

(72) Inventor: Sriram Srinivasan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 54 days.

(21) Appl. No.: 15/707,846

(22) Filed: Sep. 18, 2017

(65) Prior Publication Data
US 2019/0089642 A1    Mar. 21, 2019

(51) Int. Cl.
| | | |
|---|---|---|
| H04L 12/841 | (2013.01) | |
| H04L 12/26 | (2006.01) | |
| H04L 12/853 | (2013.01) | |
| H04L 12/835 | (2013.01) | |
| H04J 3/06 | (2006.01) | |
| H04L 29/06 | (2006.01) | |
| H04M 3/56 | (2006.01) | |

(52) U.S. Cl.
CPC .......... *H04L 47/283* (2013.01); *H04J 3/0632* (2013.01); *H04L 43/087* (2013.01); *H04L 47/2416* (2013.01); *H04L 47/30* (2013.01); *H04L 65/4038* (2013.01); *H04L 65/607* (2013.01); *H04L 65/80* (2013.01); *H04M 3/568* (2013.01); *H04L 65/403* (2013.01)

(58) Field of Classification Search
CPC .. H04L 47/283; H04L 43/087; H04L 47/2416
See application file for complete search history.

(56) References Cited

U.S. PATENT DOCUMENTS

| | | |
|---|---|---|
| 6,434,606 B1 | 8/2002 | Borella et al. |
| 6,466,550 B1 | 10/2002 | Foster et al. |
| 6,977,948 B1 | 12/2005 | Chennubhotla et al. |
| (Continued) | | |

FOREIGN PATENT DOCUMENTS

| | | |
|---|---|---|
| EP | 3203701 A1 | 8/2017 |
| WO | 2014004259 A1 | 1/2014 |

OTHER PUBLICATIONS

"International Search Report and Written Opinion Issued In PCT Application No. PCT/US2018/037974", dated Sep. 25, 2018, 14 Pages.

*Primary Examiner* — Siming Liu
(74) *Attorney, Agent, or Firm* — NovoTechIP International PLLC (57) ABSTRACT

Various embodiments of the present technology generally relate to systems and methods for packet-based communications. More specifically, some embodiments provide cause a machine (e.g., client device, data center, collaboration service, etc.) to receive data packets from a network. The data packets can include payloads that represent encoded data from a real-time communication between multiple devices and can be copied into multiple jitter buffers. The multiple jitter buffers can include a first jitter buffer having a first size and a second jitter buffer having a second size that is larger than the first size of the first jitter buffer. In some embodiments, the machine can decode the data packets or payloads from the multiple jitter buffers to create at least a first output signal from first jitter buffer and a second output signal from the second jitter buffer.

20 Claims, 7 Drawing Sheets

(56) References Cited

U.S. PATENT DOCUMENTS

| | | | |
|---|---|---|---|
| 7,768,923 B2 | 8/2010 | Kumar et al. | |
| 7,965,627 B2 | 6/2011 | Li et al. | |
| 8,213,316 B1 * | 7/2012 | Gentle | H04L 65/602 370/238 |
| 8,391,320 B2 | 3/2013 | Lubbs et al. | |
| 9,521,057 B2 | 12/2016 | Klingbeil et al. | |
| 2005/0047396 A1 | 3/2005 | Helm et al. | |
| 2012/0287769 A1 | 11/2012 | Saleem et al. | |
| 2015/0172202 A1 * | 6/2015 | Zealey | H04L 65/403 348/14.08 |
| 2016/0295539 A1 | 10/2016 | Atti et al. | |
| 2017/0026298 A1 | 1/2017 | Huo et al. | |

\* cited by examiner

DUAL JITTER BUFFERS

BACKGROUND

Modern electronic devices such as computers, tablets, mobile phones, wearable devices, gaming consoles, televisions, and the like have become a common part of modern life. Many of these devices provide for various audio and video capabilities. However, processing digital audio and videos signals can be a resource intensive task as the video data can quickly become large. For example, in real-time video communications users often prefer higher resolutions and frame rates which can quickly tax computing resources (e.g., processors, network communication components, etc.). Moreover, packets transmitted over communication networks may be subject to various delays (e.g., processing delays, propagation delays, etc.) that can degrade the performance of the user's experience. These delays are known as jitter. The amount of variation in packet arrival is commonly measured in terms of packet delay variation (PDV) or inter-arrival time (IAT) variation. These delays can have a significant effect on the quality of real-time communications (e.g., using voice over internet protocol).

In an effort to mitigate this problem, various systems use a variety of techniques including the use of a jitter buffer to counter the negative impact of variation in packet delays (i.e., jitter). The jitter buffer queues packets which can then be released in a more even manner. Unfortunately, the use of a jitter buffer introduces an additional delay between the time a packet is received and the time that the packet is reproduced. The longer the delay, the more consistent the packets can be processed. For two-way communications, however, this additional delay can degrade the user's experience. As such, there is a tradeoff when selecting the size of the jitter buffer. In contrast, one way communications can generally tolerate a longer delay and may even benefit from more consistent packet processing. Additional techniques are needed to effectively handle jitter.

Overall, the examples herein of some prior or related systems and their associated limitations are intended to be illustrative and not exclusive. Upon reading the following, other limitations of existing or prior systems will become apparent to those of skill in the art.

OVERVIEW

Various embodiments of the present technology generally relate to systems and methods for packet-based communications. More specifically, some embodiments provide cause a machine (e.g., client device, data center, collaboration service, etc.) to receive data packets from a network. The data packets can represent encoded data from a real-time communication between multiple devices and can be copied into multiple jitter buffers. The multiple jitter buffers can include a first jitter buffer having a first size and a second jitter buffer having a second size that is larger than the first size of the first jitter buffer. In some embodiments, the machine can decode the data packets from the multiple jitter buffers to create at least a first output signal from first jitter buffer and a second output signal from the second jitter buffer. As a result, the latency of an output generated from the first jitter buffer will be less than the latency of an output generated from the second jitter buffer.

In some embodiments, a transcription can be automatically generated from the second output from the second jitter buffer. The first output generated from the first jitter buffer can be used in the real-time communication between the multiple devices (e.g., since there will be a lower latency). In various embodiments, indications of network performance can be used to dynamically set the first size of the first jitter buffer and/or the second size of the second jitter buffer. In other embodiments, the sizes of the jitter buffers may be static.

The data packets can represent multiple individual channels from the real-time communications or multiplexed signals. When the data packets represent individual channels, the machine can copy the data packets into a first group of the multiple jitter buffers having a first size and into a second group of the multiple jitter buffers having a second size. In some embodiments, instead of copying the data packets the machine may use points as a reference to a memory location where the data packets are stored. Then mixed signals can be created by mixing outputs from the jitter buffers. This may be done locally or via a cloud-based application or service.

In some embodiments, each participant of the real-time communication can be identified into two or more groups (e.g., passive participants or active participants). The output signal created by decoding data packets from first jitter buffer having a lower latency can be routed to one group (e.g., the active participants) and the second output signal generated from the second jitter buffer having higher latency can be routed to the second group (e.g., the passive participants).

Embodiments of the present invention also include computer-readable storage media containing sets of instructions to cause one or more processors to perform the methods, variations of the methods, and other operations described herein.

Some embodiments provide for a system having one or more processors, memory, a network interface, multiple jitter buffers, and a decoder. The network interface can be configured to receive data packets via a network connection. A first jitter buffer can be communicably coupled to the network interface. In some embodiments, the first jitter buffer can have a first size and receives a first copy of the data packets. Similarly, a second jitter buffer communicably coupled to the network interface. The second jitter buffer has a second size that is larger than the first size of the first jitter buffer. The second jitter buffer receives a second copy of the data packets. One or more decoders can produce a first output signal and a second output by decoding data packets from the first jitter buffer or second jitter buffer. The first output from the one or more decoders can have a lower latency than the second output from the decoder and may be used as part of a real-time communication while the second output can be used to create a recording and/or transcription (e.g., using a transcription module) of the real-time communication.

Some embodiments can also include one or more mixers. The data packets received by the network interface can be individual channels from participants and the system further can use the one or more mixers to mix the individual channels into an output signal.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Embodiments of the present technology will be described and explained through the use of the accompanying drawings in which.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to systems and methods for packet-based communications. Network jitter (or variation in packet arrival time) is a leading cause of poor audio quality, particularly in mobile and WiFi networks. Jitter compensation is essential for smooth playback of audio. One commonly used tool is a jitter buffer. For example, VoIP systems typically employ a jitter buffer at the receiver to compensate for variations in packet arrival times (i.e., jitter). While jitter buffers are designed to compensate for the impact of jitter, jitter buffers introduce additional latency and their effectiveness is constrained by limits on tolerable latency in real-time communications. An important trade-off in jitter buffer design is between the latency that is introduced due to the buffering and the amount of jitter that can be compensated.

Traditional solutions typically employ only a single jitter buffer. This single jitter buffer is constrained by the inherent trade-off between the latency that is introduced by the buffering and the amount of jitter that can be compensated. Furthermore, current jitter buffer designs are not adequate for new applications such as meeting transcription, where speech recognition accuracy is impacted by audible artifacts introduced due to jitter. For example, a jitter buffer that satisfies latency constraints for real-time communication will not be sufficient under poor network conditions for tasks such as speech recognition.

In contrast, various embodiments of the present technology use more than one jitter buffer. For example, in some embodiments, a short jitter buffer may be employed for communications in conjunction with a second longer jitter buffer for meeting transcription and recordation. In other embodiments, certain users in a conference call may be more tolerant to higher latency. As such, a server can exploit this fact by maintaining two or more jitter buffers so different participants are served audio with different latencies (and different amounts of resilience to network jitter). For example, in accordance with various embodiments, a live meeting transcription may be desired for a conference call. One jitter buffer may be used for low latency real-time communication. In addition, a second larger buffer can be maintained for the purpose of providing jitter-free speech for automatic speech recognition since meeting transcription can tolerate higher latencies but need less jitter. As another example, the live meeting may need to be recorded for subsequent viewing. As latency is not of concern in this scenario, a second higher latency jitter buffer that can better handle network jitter can be used to produce higher-quality recordings while a low latency jitter buffer can be used for real-time communications during the call.

Various embodiments of the present technology provide for a wide range of technical effects, advantages, and/or improvements to computing systems and components. For example, various embodiments include one or more of the following technical effects, advantages, and/or improvements: 1) use of multiple jitter buffers with different latency tradeoffs; 2) ability to increase the quality of real-time communications while simultaneously producing a high quality version (e.g., for recording or transcription); 3) separate users within a real-time communication application into two or more groups based on latency tolerances; 4) provide multiple outputs of differing qualities; 5) create improvements to the way computing devices operate; 6) use unconventional and non-routine operations as part of network-based communications; and/or 7) change the manner in which a computing system handles data packets. Some embodiments include additional technical effects, advantages, and/or improvements to computing systems and components.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Figure 1:
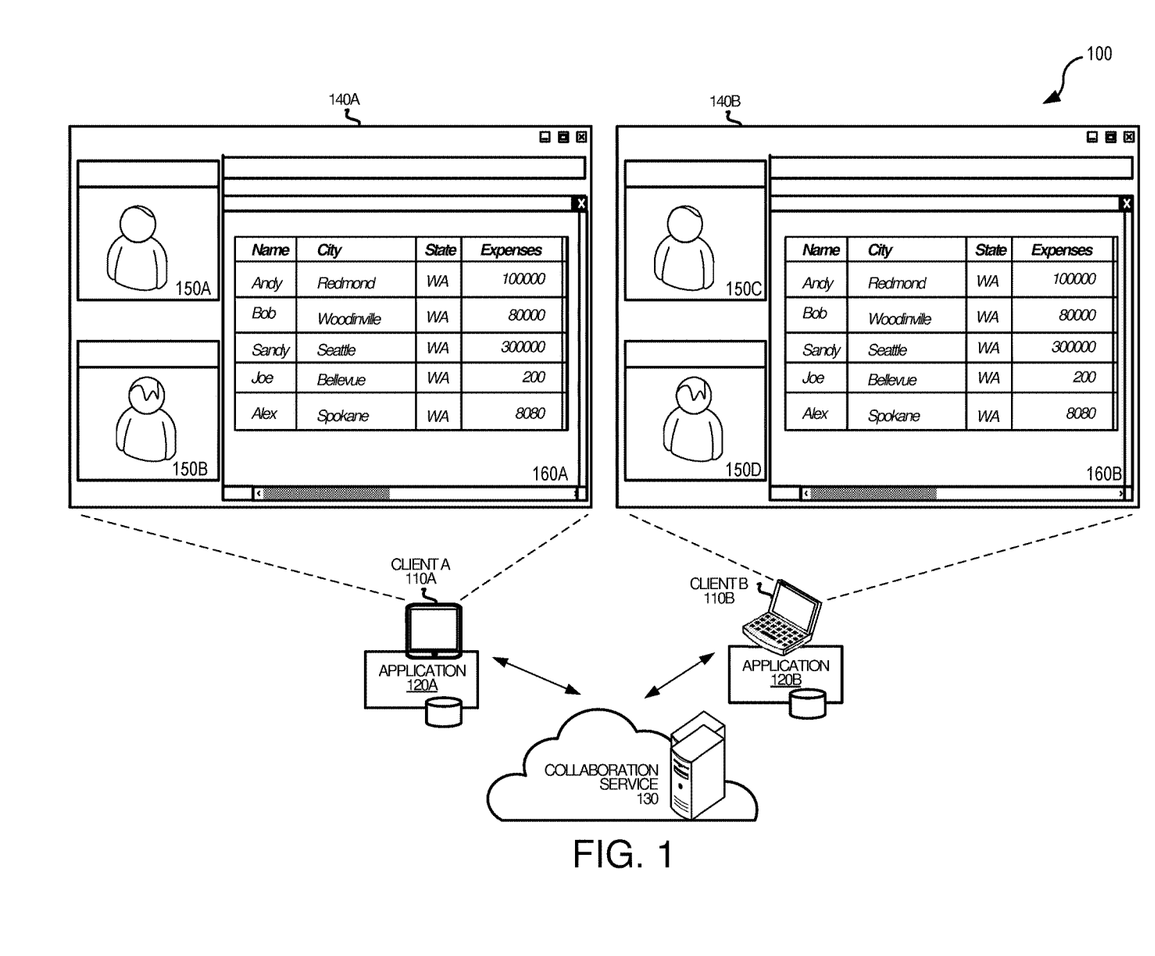
FIG. 1 illustrates an example of an environment in which dual jitter buffers may be used in accordance with some embodiments of the present technology.

FIG. 1 illustrates an example of an environment 100 in which dual jitter buffers may be used in accordance with some embodiments of the present technology. As illustrated in FIG. 1, first client device 110A runs application 120A that can use collaboration service 130 to connect client device 110A to client device 110B. Client devices 110A-110B can be any computing system capable of running an application natively or in the context of a web browser, streaming an application, or executing an application in any other manner Examples of client devices 110A-110B include, but are not limited to, electronic devices, personal computers, mobile phones, tablet computers, mobile media devices, desktop computers, laptop computers, wearable computing devices, or any other form factor, including any combination of computers or variations thereof.

Figure 7:
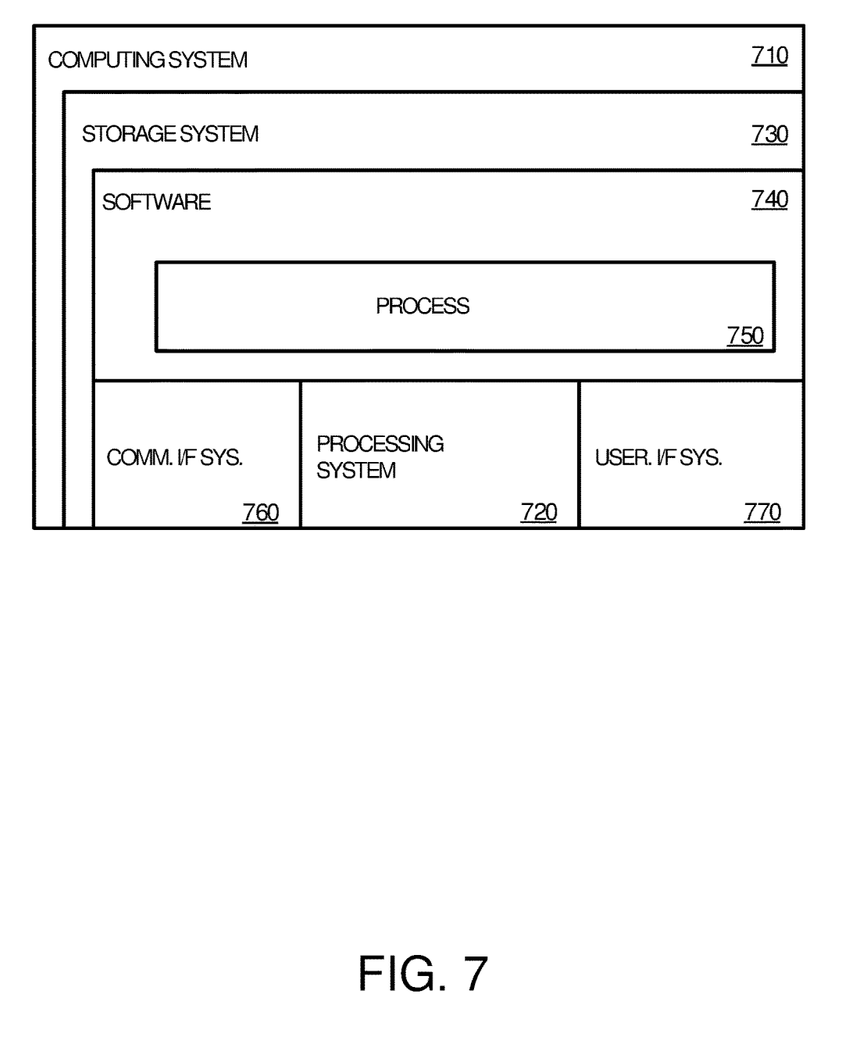
FIG. 7 illustrates an example of a computing system, which is representative of any system or collection of systems in which the various applications, services, scenarios, and processes disclosed herein may be implemented.

Client devices 110A-110B may include various hardware and software elements in a supporting architecture suitable for providing various productivity applications. Collaboration service 130 can facilitate real-time communications such as video conferencing, desktop sharing, and the like. One such representative architecture of a computing device (e.g., client devices 110A-110B or used to host collaboration service 130) is illustrated in FIG. 7 with respect to computing system 710.

Client devices 110A-110B and/or collaboration service 130 may also include audio/video encoders/decoders that can be used to compress the streaming videos and audio. Examples of some of the most popular audio encoders include, but are not limited to OPUS, SILK, G.722, and the like. Some embodiments may use more than one jitter buffer at a decoder, where each buffer maintains a different latency/jitter-compensation trade-off depending on the end-user scenario. Applications 120A and 120B may generate graphical user interfaces 140A and 140B to show the live camera feed 150A-150D from client devices 110A-110B. Graphical user interfaces 140A-140B may allow one of the client devices to share a desktop, e.g., for presenting a file, in section 160 of the graphical user interface.

Those skilled in the art will appreciate that various components (not shown) may be included in client devices 110A-110B and collaboration service 130 to enable network communication with communication network. In some cases, the communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Various embodiments client device 110A-110B and/or collaboration service 130 may use more than one jitter buffer. In some embodiments, a short jitter buffer may be employed for communications in conjunction with a second longer jitter buffer for meeting transcription and recordation. In other embodiments, certain users in a conference call may be more tolerant to higher latency. As such, a server (e.g., hosting collaboration service 130) can exploit this fact by maintaining two or more jitter buffers so different participants are served audio with different latencies (and different amounts of resilience to network jitter). For example, in accordance with various embodiments, a live meeting transcription may be desired for a conference call. One jitter buffer may be used for low latency real-time communication while a second larger buffer can be maintained for the purpose of providing jitter-free speech for automatic speech recognition since meeting transcription can tolerate higher latencies but need less jitter. As another example, the live meeting may need to be recorded for subsequent viewing. As latency is not of concern in this scenario, a second higher latency jitter buffer that can better handle network jitter can be used to produce higher-quality recordings while a low latency jitter buffer can be used for real-time communications during the call.

Figure 2:
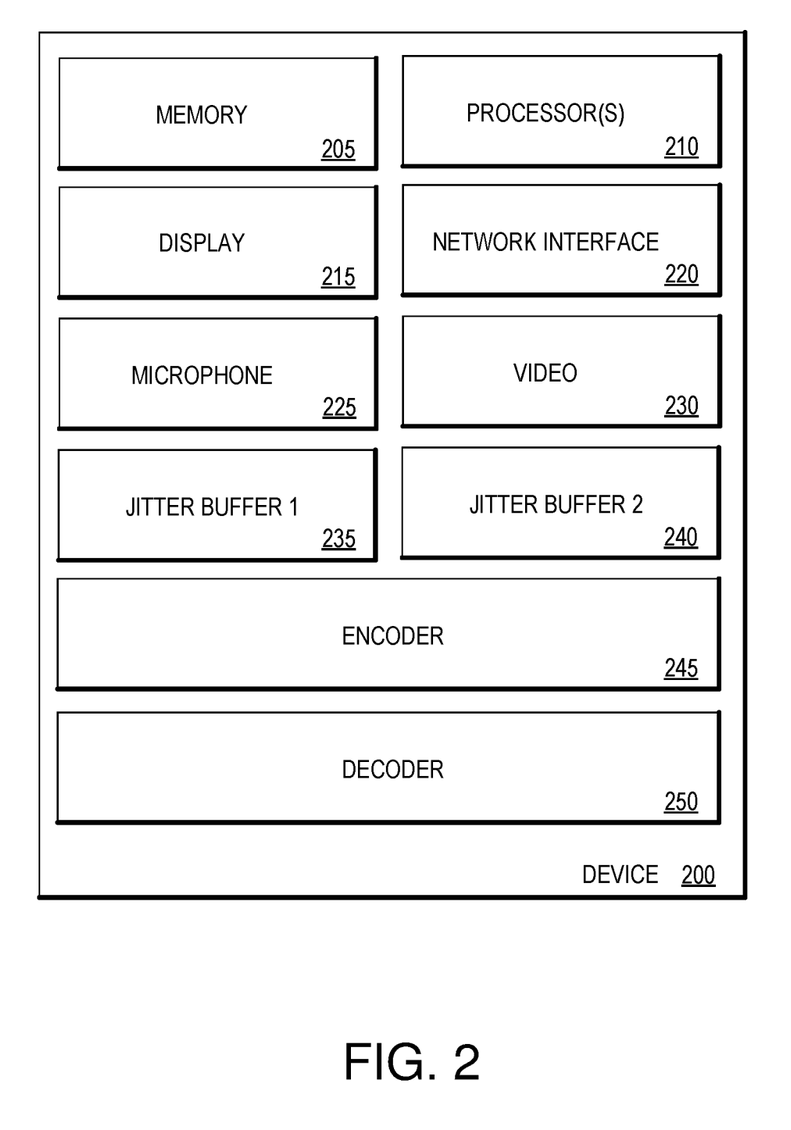
FIG. 2 illustrates a set of components associated with an electronic device that may be used in one or more embodiments of the present technology.

FIG. 2 illustrates a set of components associated with electronic device 200 that may be used in one or more embodiments of the present technology. As illustrated in FIG. 2, device 200 can include multiple components such as memory 205 (e.g., volatile memory and/or nonvolatile memory), processor(s) 210, display 215, network interface 220, microphone 225, video capture device 230, first jitter buffer 235, second jitter buffer 240, encoder 245, and decoder 250. Additional components, not shown in FIG. 2, such as data storage components (e.g., hard drive, flash memory, memory card, etc.), batteries, keypads or keyboards or other inputs and/or output device may be present.

Processor(s) 210 are the main processors of device 200 and may include application processors, baseband processors, various coprocessors, and other dedicated processors for the devices. For example, an application processor can provide the processing power to support software applications, memory management, graphics processing, and multimedia. An application processor may be communicably coupled with memory and configured to run the operating system, the user interface, and the applications stored on memory. A baseband processor may be configured to perform signal processing and implement/manage real-time radio transmission operations of the devices. The volatile and nonvolatile memories found in various embodiments may include storage media for storing information such as processor-readable instructions, data structures, program modules, or other data. Some examples of information that may be stored include basic input/output systems (BIOS), operating systems, and applications.

Various embodiments of electronic device 200 can use multiple jitter buffers (e.g., jitter buffers 235 and 240) with each jitter buffer set with different buffer lengths. Data packets received via network interface 220 can be inserted (e.g., copied) or referenced (e.g., using a pointer to a memory location where the data packets are stored) into each jitter buffer (or a pointer referencing a memory location before processing by decoder(s) 250. For example, in some embodiments, jitter buffer 235 may be a short jitter buffer while jitter buffer 240 can have a longer queue thereby removing the impact of the arrival time variation. Jitter buffer 235 with the shorter queue length can be employed for real-time communications while jitter buffer 240 with the longer queue length can be used for meeting transcription and recordation. Decoder(s) 250 can be any decoding tool capable of operating in any of multiple decoding modes (e.g., a low-latency decoding mode for real-time communication, etc.). Encoder 245 can be configured to operate in one or more encoding modes (e.g., a low-latency encoding mode for real-time communication).

For example, in some embodiments, the output resulting from the short jitter buffer path may be employed for real-time communications (e.g., VoIP call, screen sharing, etc.). The output resulting from the second longer jitter buffer will have a higher latency and may be used for meeting transcription or recordation. In other embodiments, certain users in a conference call may be more tolerant to higher latency. As such, a server can exploit this fact by maintaining two or more jitter buffers so different classes of participants are served audio with different latencies (and different amounts of resilience to network jitter).

In other embodiments, certain users in a conference call may be more tolerant to higher latency. As such, a server can exploit this fact by maintaining two or more jitter buffers so different participants are served audio with different latencies (and different amounts of resilience to network jitter). For example, in accordance with various embodiments, a live meeting transcription may be desired for a conference call. One jitter buffer may be used for low latency real-time communication. In addition, a second larger buffer can be maintained for the purpose of providing jitter-free speech for automatic speech recognition since meeting transcription can tolerate higher latencies but need less jitter. As another example, the live meeting may need to be recorded for subsequent viewing. As latency is not of concern in this scenario, a second higher latency jitter buffer that can better handle network jitter can be used to produce higher-quality recordings while a low latency jitter buffer can be used for real-time communications during the call.

Figure 3:
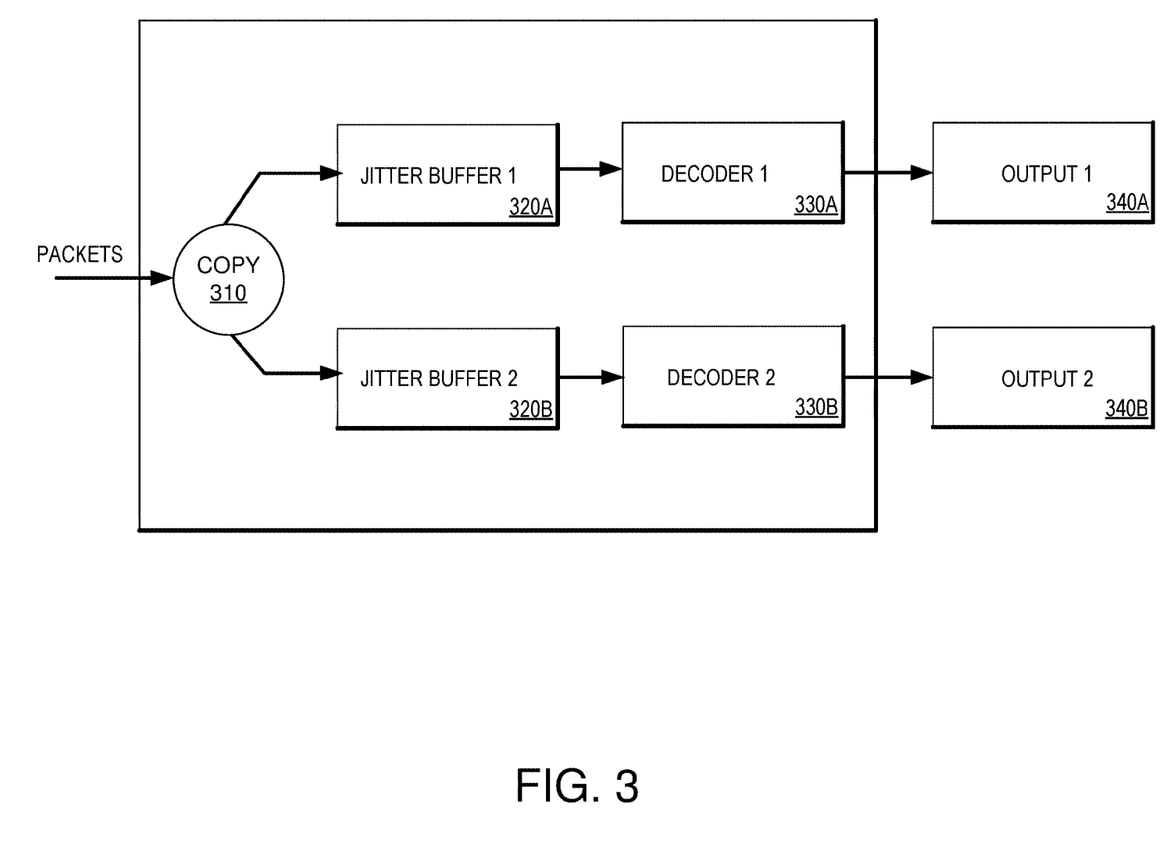
FIG. 3 illustrates a dual jitter buffer that may be used in one or more embodiments of the present technology according to one or more embodiments of the present technology.

FIG. 3 illustrates a dual jitter buffer that may be used in one or more embodiments of the present technology according to one or more embodiments of the present technology. The embodiments illustrated in FIG. 3 may be embodied in a client device or server. As data packets are received, duplication module 310 can place actual copies or virtual copies (e.g., a pointer referencing a master copy stored in a memory or buffer) of the packets to two (or more) jitter buffers 320A and 320B each having a different length. The length of each jitter buffer 320A and 320B may be static or dynamically set based on purpose, needed, output, network conditions, packet arrival variations, and/or other factors. Each buffer can be connected to a decoder 330A or 330B which decodes the packets producing an output 340A or 340B.

Figure 4:
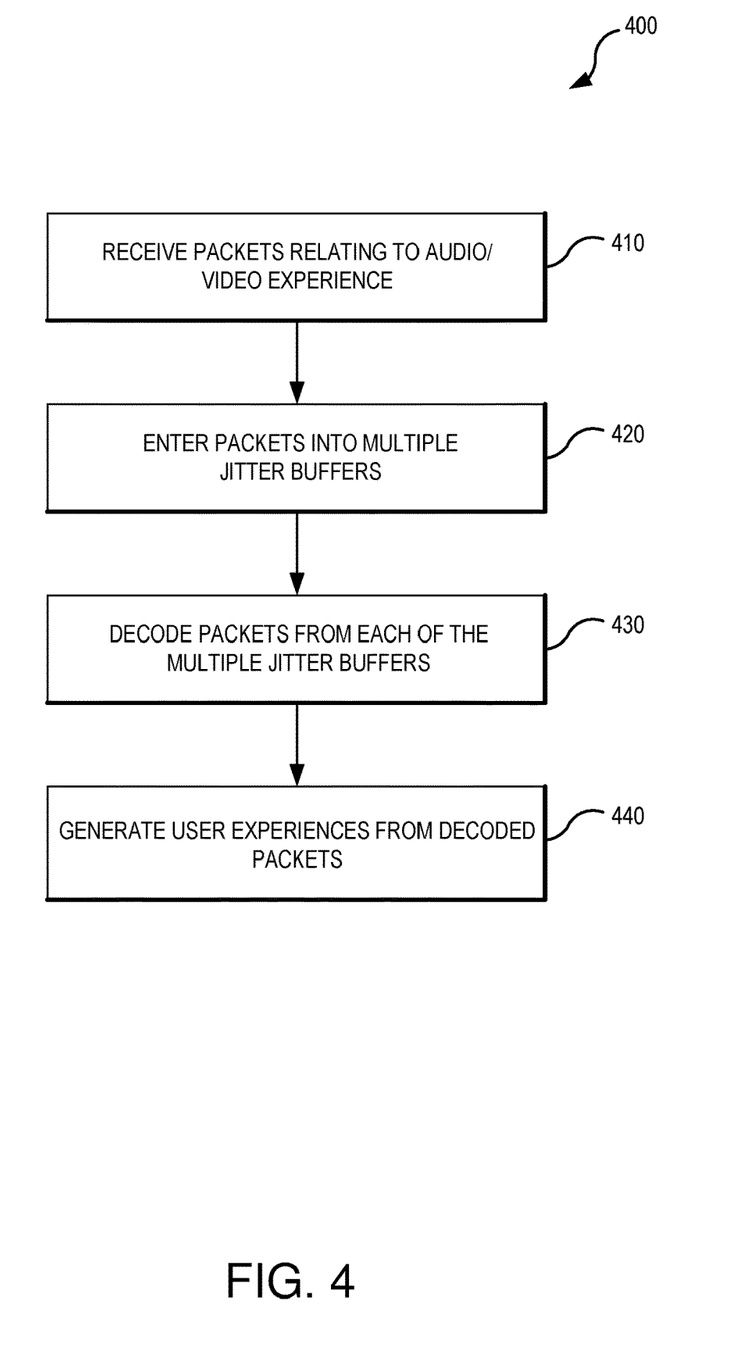
FIG. 4 illustrates an example of a set of operations for processing packets according to one or more embodiments of the present technology.

FIG. 4 illustrates an example of a set of operations for processing packets according to one or more embodiments of the present technology. These operations may be performed by various systems or components such as, but not limited to, client devices 110A-110B, collaboration service 130, processor(s) 210, display 215, network interface 220, microphone 225, video capture device 230, first jitter buffer 235, second jitter buffer 240, encoder 245, and decoder 250, computing system 710, and/or other component, computing device, or module. As illustrated in FIG. 4, receiving operations 410 receives packets relating to an audio and/or video experience. Duplication operation 420 enters the packets into two or more jitter buffers that can have different queue lengths or sizes.

In some embodiments, duplication operation 420 may also select a subset of available jitter buffers based on user preferences, final products needed, network speed, other system activity, jitter buffer availability, and/or other factors. In some embodiments, the length of delay introduced by the jitter buffers may be static while the length may be dynamically set based on one or more of factors (e.g., end use, network speed, user preferences, etc.). Once the jitter buffers are selected and the data packets are copied into each selected jitter buffer, decoding operation 430 can process the packets from each jitter buffer. The packets may be preprocessed and different decoders may be used to produce different outputs. In some embodiments, voice recognition, transcription, high quality outputs, real-time communications, and other may all be a part of the user experiences created via generation operation 440.

Figure 5:
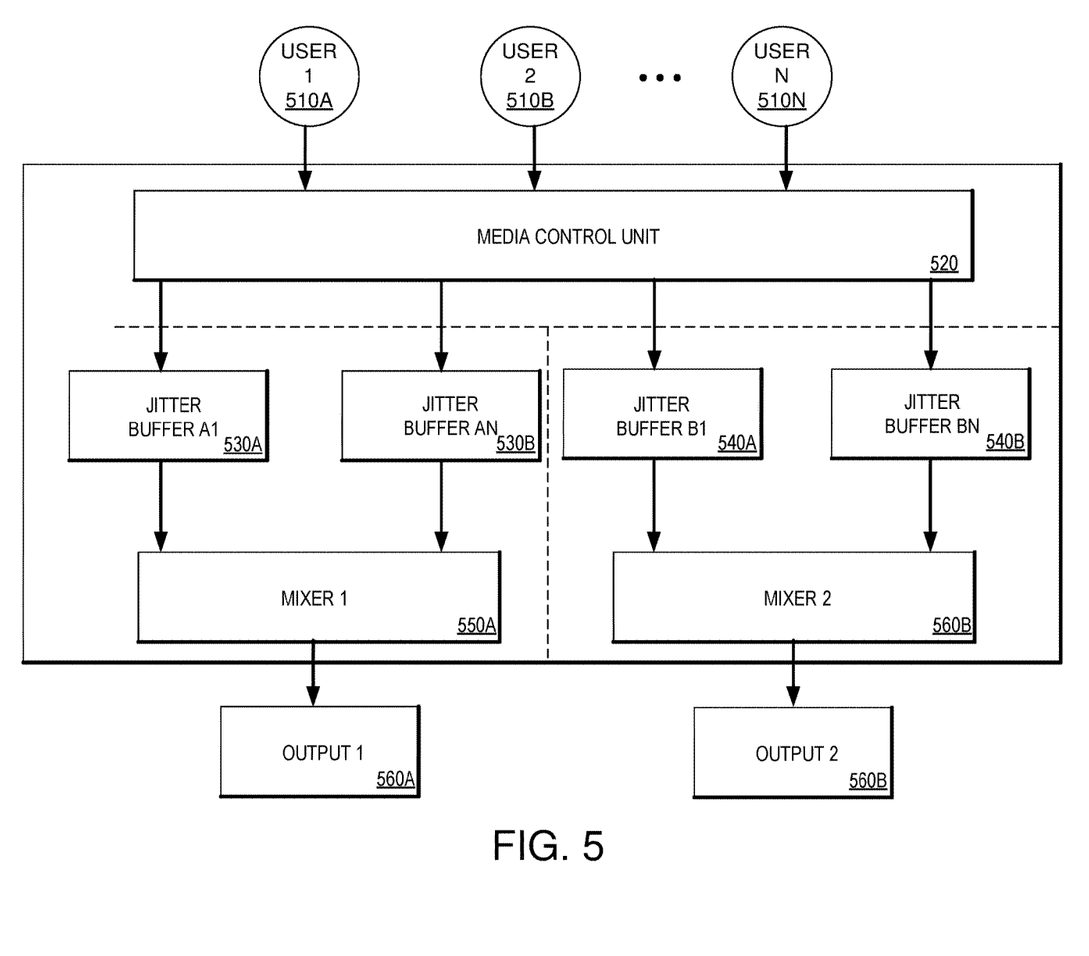
FIG. 5 illustrates an example of a set of components within a data center that may according to one or more embodiments of the present technology.

FIG. 5 illustrates an example of a set of components within a data center that may according to one or more embodiments of the present technology. In the embodiments illustrated in FIG. 5, a variety of participants 510A-510N may be dialing into a conference call. For large conference calls, for example calls within large organizations providing topical information, there may be only a few speakers that may be located in different offices. As such, it is important to minimize the latency between these callers. The remaining callers may be passive participants (e.g., only listening and/or view power point presentation) and as such can handle a larger delay in return for a better call experience.

In some embodiments, as participants 510A-510N join the call they can be identified as an active participant or a passive participant. For example, the participants could self-identify as passive or active. As another example, in some embodiments, the organizer may classify the participants as active. Media control unit 520 can manage multiple calls. As data packets are received with encoded data from the participants of a call, media control unit can route the packets to multiple jitter buffers 530A-530B or 540A-540N. Each set of jitter buffers can have different lengths depending on the purpose (e.g., one for active real-time communication participants with low latency, one with a higher latency for passive participants, a third with even higher latency for recording, transcription or other service, etc.).

In accordance with various embodiments, media control unit 520 can copy each caller or active caller's data packets to multiple jitter buffers (e.g., long jitter buffer and a short jitter buffer). Each set of jitter buffers of the same length are routed to a mixer 550A or 550B which mixes or multiplexes the individual data streams into a common stream. Each stream is provided as an output 560A or 560B which can then be used as needed. For example, if jitter buffers 530A-530B are the low latency jitter buffers and jitter buffers 540A-540B have a higher latency, then output 1 could be routed back to the active participants while output 2 could be routed back to the passive participants.

Figure 6:
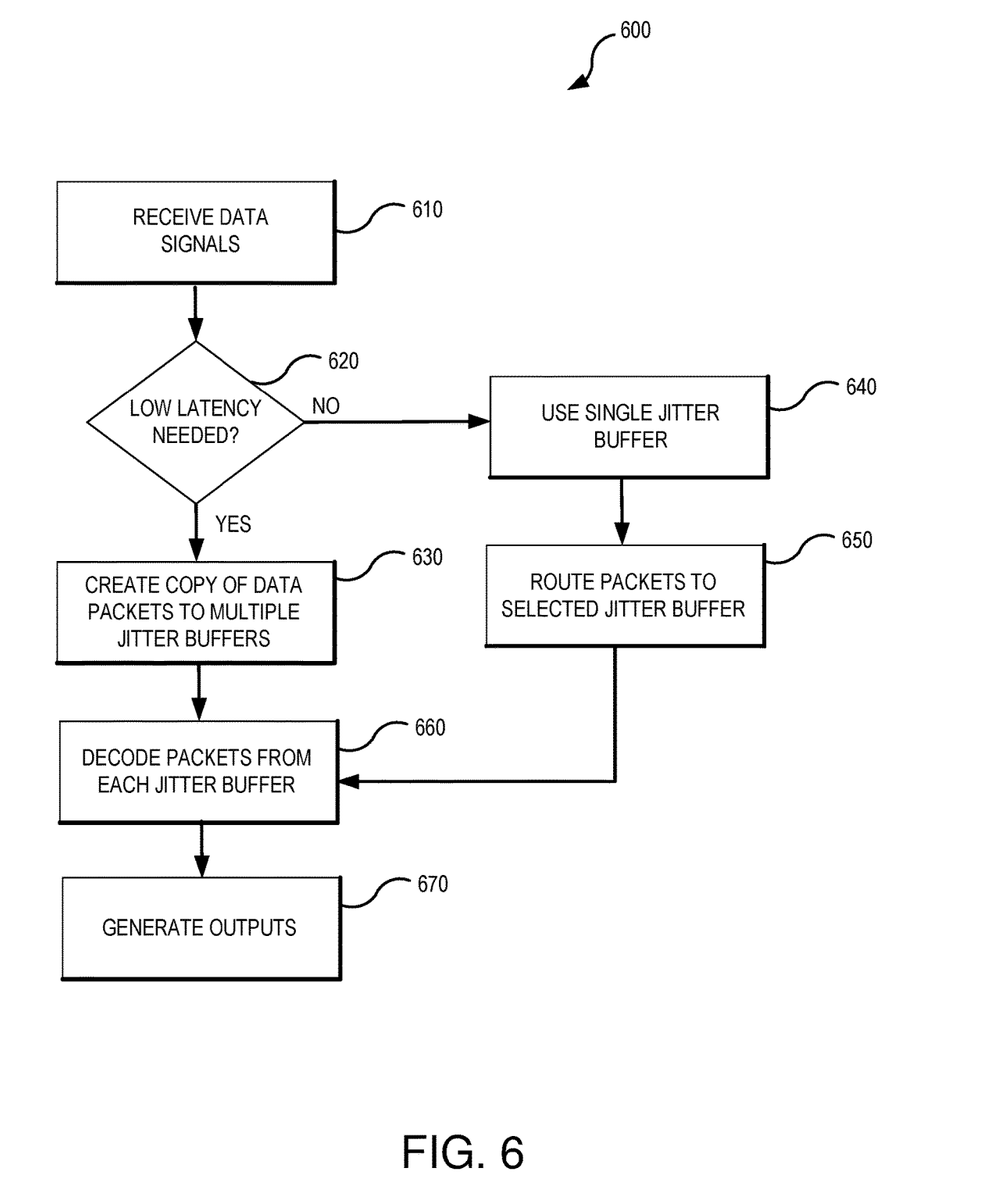
FIG. 6 illustrates an example of a set of operations for using one or more jitter buffers according to one or more embodiments of the present technology.

FIG. 6 illustrates an example of a set of operations 600 for using one or more jitter buffers according to one or more embodiments of the present technology. These operations may be performed by various systems or components such as, but not limited to, client devices 110A-110B, collaboration service 130, processor(s) 210, display 215, network interface 220, microphone 225, video capture device 230, first jitter buffer 235, second jitter buffer 240, encoder 245, and decoder 250, computing system 710, and/or other component, computing device, or module.

As illustrated in FIG. 6, receiving operation 610 receives data packets. In accordance with various embodiments, these data packets can represent audio and/or video streams for real-time communications (e.g., VoIP). Determination operation 620 can determine whether a low-latency experience is needed (e.g., for a transcription, recording, etc.). Determination operation 620 may use various flags or settings provided by the user via an application. For example, a user may request that a transcription be created, a recording be provided, etc. When determination operation 620 determines that a low latency experience is needed, then determination operation 620 branches to copy operation 630 where the data packets are copied (e.g., actual copies or virtual copies using pointers) into multiple jitter buffers. For example, in some embodiments, a short jitter buffer may be employed for real-time communications in conjunction with a second longer jitter buffer for meeting transcription and recordation.

When determination operation 620 determines that a low latency experience is not needed, then determination operation 620 branches to selection operation 640 where a single jitter buffer is selected and routing operation 650 routes the data packets to the selected jitter buffer. Decoding operation 660 can decode packets from each jitter buffer being used. In some embodiments, different decoding techniques may be used to process the packets before generation operation 670 generates the final outputs (e.g., transcriptions, recordings, etc.).

FIG. 7 illustrates computing system 710, which is representative of any system or collection of systems in which the various applications, services, scenarios, and processes disclosed herein may be implemented. For example, computing system 710 may include server computers, blade servers, rack servers, and any other type of computing system (or collection thereof) suitable for carrying out the enhanced collaboration operations described herein. Such systems may employ one or more virtual machines, containers, or any other type of virtual computing resource in the context of supporting enhanced group collaboration.

Computing system 710 may be implemented as a single apparatus, system, or device or may be implemented in a distributed manner as multiple apparatuses, systems, or devices. Computing system 710 includes, but is not limited to, processing system 720, storage system 730, software 740, applications 750, communication interface system 760, and user interface system 770. Processing system 720 is operatively coupled with storage system 730, communication interface system 760, and an optional user interface system 770.

Processing system 720 loads and executes software 740 from storage system 730. When executed by processing system 720 for deployment of scope-based certificates in multi-tenant cloud-based content and collaboration environments, software 740 directs processing system 720 to operate as described herein for at least the various processes, operational scenarios, and sequences discussed in the foregoing implementations. Computing system 710 may optionally include additional devices, features, or functionality not discussed for purposes of brevity.

Referring still to FIG. 7, processing system 720 may comprise a micro-processor and other circuitry that retrieves and executes software 740 from storage system 730. Processing system 720 may be implemented within a single processing device, but may also be distributed across multiple processing devices or sub-systems that cooperate in executing program instructions. Examples of processing system 720 include general purpose central processing units, application specific processors, and logic devices, as well as any other type of processing device, combinations, or variations thereof.

Storage system 730 may comprise any computer readable storage media readable by processing system 720 and capable of storing software 740. Storage system 730 may include volatile and nonvolatile, removable and non-removable media implemented in any method or technology for storage of information, such as computer readable instructions, data structures, program modules, or other data. Examples of storage media include random access memory, read only memory, magnetic disks, nonvolatile memory, battery backed memory, Non-Volatile DIMM memory, phase change memory, memristor memory, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 730 may also include computer readable communication media over which at least some of software 740 may be communicated internally or externally. Storage system 730 may be implemented as a single storage device, but may also be implemented across multiple storage devices or sub-systems co-located or distributed relative to each other. Storage system 730 may comprise additional elements, such as a controller, capable of communicating with processing system 720 or possibly other systems.

Software 740 may be implemented in program instructions and among other functions may, when executed by processing system 720, direct processing system 720 to operate as described with respect to the various operational scenarios, sequences, and processes illustrated herein. For example, software 740 may include program instructions for directing the system to perform the processes described above.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 740 may include additional processes, programs, or components, such as operating system software, virtual machine software, or application software. Software 740 may also comprise firmware or some other form of machine-readable processing instructions executable by processing system 720.

In general, software 740 may, when loaded into processing system 720 and executed, transform a suitable apparatus, system, or device (of which computing system 710 is representative) overall from a general-purpose computing system into a special-purpose computing system. Indeed, encoding software on storage system 730 may transform the physical structure of storage system 730. The specific transformation of the physical structure may depend on various factors in different implementations of this description. Examples of such factors may include, but are not limited to, the technology used to implement the storage media of storage system 730 and whether the computer-storage media are characterized as primary or secondary storage, as well as other factors.

For example, if the computer readable storage media are implemented as semiconductor-based memory, software 740 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 760 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 770 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 770. In some cases, the input and output devices may be combined in a single device, such as a display capable of displaying images and receiving touch gestures. The aforementioned user input and output devices are well known in the art and need not be discussed at length here. In some cases, the user interface system 770 may be omitted when the computing system 710 is implemented as one or more server computers such as, for example, blade servers, rack servers, or any other type of computing server system (or collection thereof).

User interface system 770 may also include associated user interface software executable by processing system 720 in support of the various user input and output devices discussed above. Separately or in conjunction with each other and other hardware and software elements, the user interface software and user interface devices may support a graphical user interface, a natural user interface, an artificial intelligence (AI) enhanced user interface that may include a virtual assistant or bot (for example), or any other type of user interface, in which a user interface to a productivity application may be presented.

Communication between computing system 710 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. In any of the aforementioned examples in which data, content, or any other type of information is exchanged, the exchange of information may occur in accordance with any of a variety of well-known data transfer protocols.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and Figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A system comprising:
   a memory;
   a processor;
   a network interface configured to receive data packets via a network connection, wherein the data packets are from a communication session having multiple participants;
   a media control unit to identify each of the multiple participants as active participants or as passive participants;
   a first set of jitter buffers, communicably coupled to the network interface, and each assigned to one of the active participants,
      wherein the first set of jitter buffers each have a first size and receives information associated with the data packets;
   a second set of jitter buffers, communicably coupled to the network interface, and each assigned to one of the passive participants,
      wherein the second set of jitter buffers each have a second size that is larger than the first size of the first set of jitter buffers; and
      wherein the second set of jitter buffers receives the information associated with the data packets; and
   a decoder to decode data packets from the first set of jitter buffers to create a first output signal which is routed to the active participants and to decode data packets from the second set of jitter buffers to create a second output signal which is routed to the passive participants.

2. The system of claim 1, wherein the information associated with the data packets includes a copy of a payload from the data packets or a pointer to the payload of the data packets stored in the memory and wherein first output signal from the decoder has a lower latency than the second output signal from the decoder and is used as part of a real-time communication within the communication session.

3. The system of claim 2, wherein second output signal is used to create a recording of the real-time communication.

4. The system of claim 3, wherein the real-time communication includes an audio portion and the system further comprises a transcription module to receive the second output signal and generate a transcript of the audio portion of the real-time communication.

5. The system of claim 1, wherein the data packets received by the network interface are individual channels from multiple participants and the system further comprising a mixer to mix the individual channels.

6. The system of claim 1, wherein the first size of the first set of jitter buffers and the second set of jitter buffers are dynamically set based on network conditions.

7. A data storage component having instructions stored thereon instructions that when executed by one or more processors cause a machine to:
receive data packets from a network,
wherein the data packets include payloads representing encoded data from a real-time communication between multiple devices; and
identify each of the multiple devices as being associated with active participants or passive participants to the real-time communication;
filling multiple jitter buffers with a copy of, or a reference to, the payloads from the data packets,
wherein the multiple jitter buffers include a first set of litter buffers each having a first size and a second set of jitter buffers each having a second size that is larger than the first size of the first jitter buffer, and
wherein the first set of jitter buffers are assigned to the active participants and the second set of jitter buffers are assigned to the passive participants; and
decode the payloads from the data packets from the multiple jitter buffers to create at least a first output signal from first set of jitter buffers that is routed to the active participants and a second output signal from the second set of jitter buffers that is routed to the passive participants.

8. The data storage component of claim 7, wherein the instructions when executed by the one or more processors further cause the machine to generate a transcription from the second output signal generated from the second set of jitter buffers having a second size that is larger than the first size of the first set of jitter buffers.

9. The data storage component of claim 7, wherein the instructions when executed by the one or more processors further cause the machine to utilize the first output signal from the first jitter buffer in the real-time communication between the multiple devices.

10. The data storage component of claim 7, wherein the instructions when executed by the one or more processors further cause the machine to monitor network conditions and dynamically set the first size of the first set of jitter buffers based on network conditions.

11. The data storage component of claim 7, wherein the first size of the first set of jitter buffers and the second size of the second set of jitter buffers are static.

12. The data storage component of claim 7, wherein the data packets represent multiple individual channels from the real-time communication and the instructions when executed by the one or more processors further cause the machine to:
copy the payloads from the data packets into the first set of jitter buffers having the first size and into the second set of jitter buffers having the second size;
create a first mixed signal by mixing outputs from the first set of jitter buffers; and
create a second mixed signal by mixing output from the second set of jitter buffers.

13. The data storage component of claim 12, wherein the instructions when executed by the one or more processors further cause the machine to create the first mixed signal and the second mixed signal by submitting the data packets to a cloud-based mixing platform.

14. The data storage component of claim 7, wherein each participant using one of the multiple devices self-identify as a passive participant or an active participant or an organizer of the real-time communication classifies each participant as a passive participant or an active participant.

15. The data storage component of claim 14, wherein the instructions when executed by the one or more processors further cause the machine to route the first output signal created by decoding the payloads from the data packets from first jitter buffer having a lower latency to each of the active participants and the second output signal generated from the second jitter buffer having higher latency to each of the passive participants.

16. A method comprising:
receiving, via a network interface, data packets from a network,
wherein the data packets represent encoded data from a real-time communication session having multiple participants;
identifying each of the multiple participants as active participants or passive participants;
copying the data packets into a first jitter buffer and a second jitter buffer,
wherein the first jitter buffer has a first size and is each assigned to the active participants; and
wherein the second jitter buffer has a second size that is larger than the first size of the first jitter buffer is assigned to the passive participants; and
decoding the data packets from the first jitter buffer and the second jitter buffer to create a-first output signal from first jitter buffer to be routed to the active participants and a second output signal from the second jitter buffer to be routed to the passive participants.

17. The method of claim 16, further comprising automatically generating a transcription from the second output signal generated from the second jitter buffer having a second size that is larger than the first size of the first jitter buffer.

18. The method of claim 16, further comprising using the first output signal from the first jitter buffer in the real-time communication between the multiple participants.

19. The method of claim 16, further comprising monitoring network conditions and dynamically setting the first size of the first jitter buffer based on network conditions.

20. The method of claim 16, wherein the data packets represent multiple individual channels from the real-time communication session and the method further comprises:
copying the data packets into a first group of multiple jitter buffers having the first size and into a second group of multiple jitter buffers having the second size;
generating a first mixed signal by mixing outputs from the first jitter buffer; and
generating a second mixed signal by mixing output from the second jitter buffer.

* * * * *